United States Patent [19]

Terauchi et al.

[11] Patent Number: 5,102,315

[45] Date of Patent: Apr. 7, 1992

[54] ORBITING MEMBER FLUID DISPLACEMENT APPARATUS WITH ROTATION PREVENTING MECHANISM

[75] Inventors: Kiyoshi Terauchi, Isesaki; Norio Kitano, Fujioka, both of Japan

[73] Assignee: Sanden Corporation, Gunma, Japan

[21] Appl. No.: 584,258

[22] Filed: Sep. 18, 1990

[30] Foreign Application Priority Data

Sep. 18, 1989 [JP] Japan .................................. 1-240173

[51] Int. Cl.$^5$ .................. F01C 1/04; F01C 21/02; F16D 3/04
[52] U.S. Cl. .................................. 418/55.3; 464/103
[58] Field of Search ................ 418/55.3; 464/102, 103

[56] References Cited

U.S. PATENT DOCUMENTS

| 847,069 | 3/1907 | Hawkins | 384/158 |
|---|---|---|---|
| 2,813,409 | 11/1957 | Wolcott | 464/102 |
| 3,874,827 | 4/1975 | Young | 418/57 |
| 3,924,977 | 12/1975 | McCullough | 418/57 |
| 4,082,484 | 4/1978 | McCullough | 418/57 |
| 4,121,438 | 10/1978 | McCullough | 464/102 |
| 4,160,629 | 7/1979 | Hidden et al. | 418/55.3 |
| 4,259,043 | 3/1981 | Hidden et al. | 418/55.3 |
| 4,303,379 | 12/1981 | Hiraga et al. | 418/55.2 |
| 4,325,683 | 4/1982 | Miyazawa | 418/55.3 |
| 4,406,600 | 9/1983 | Terauchi et al. | 418/55.3 |
| 4,474,543 | 10/1984 | Hiraga et al. | 418/55.3 |
| 4,492,543 | 1/1985 | Iimori et al. | 418/55.3 |

FOREIGN PATENT DOCUMENTS

| 1960216 | 6/1971 | Fed. Rep. of Germany . |
|---|---|---|
| 928465 | 11/1947 | France . |
| 932871 | 4/1948 | France . |
| 976187 | 3/1951 | France . |
| 63-61790 | 6/1988 | Japan . |
| 63-154878 | 10/1988 | Japan . |
| 1-182587 | 3/1989 | Japan . |
| 64-77779 | 4/1989 | Japan . |
| 1-219377 | 10/1989 | Japan . |

Primary Examiner—John J. Vrablik
Attorney, Agent, or Firm—Banner, Birch, McKie & Beckett

[57] ABSTRACT

The present invention discloses a durable rotation preventing/thrust bearing device for use in an orbiting member fluid displacement apparatus. The rotation preventing/thrust bearing device includes a discrete fixed portion, a discrete orbital portion and bearing elements. The fixed portion includes a first race and first ring both of which are formed separately. The first race is placed in a first groove in an inner surface of the housing and the first ring is attached to the housing. The orbital portion includes a second race and second ring both of which are formed separately. The second race is placed in a second groove in an end plate of the orbiting member and the second ring is attached to the end plate of the orbiting member. A plurality of pockets of the rings face one another in generally aligned pairs. A bearing element is received in each aligned pair of pockets to prevent the rotation of the orbiting member by the bearing elements interacting with the first and second rings and to carry the axial thrust load from the orbiting member. The first and second races are placed within the first and second annular grooves respectively in order to be able to circumferentially and radially move within a restricted range.

27 Claims, 9 Drawing Sheets

ORBITING MEMBER FLUID DISPLACEMENT APPARATUS WITH ROTATION PREVENTING MECHANISM

BACKGROUND OF THE INVENTION

1. Field of the Invention

This invention relates to a rotary fluid displacement apparatus, and more particularly, to an improvement in a rotation preventing/thrust bearing device for an orbiting member fluid displacement apparatus.

2. Description of the Prior Art

There are several types of fluid apparatus which utilize an orbiting piston or fluid displacing member, such as a scroll type fluid displacement apparatus disclosed in U.S. Pat. No. 801,182 (Creux).

The scroll type fluid displacement apparatus disclosed in this U.S. patent includes two scrolls each having a circular end plate and a spiroidal or involute spiral element. These scrolls are maintained angularly and radially offset so that both spiral elements interfit to make a plurality of line contacts between their spiral curved surfaces to thereby seal off and define at least one pair of fluid pockets. The relative orbital motion of the two scrolls shifts the line contacts along the spiral curved surfaces and, as a result, the volume of the fluid pockets changes. Since the volume of the fluid pockets increases or decreases dependent on the direction of the orbital motion, the scroll type fluid displacement apparatus is applicable to compress, expand or pump fluids.

Generally, in conventional scroll type fluid displacement apparatus, one scroll is fixed to a housing and the other scroll, which is the orbiting scroll, is eccentrically supported on a crank pin of a rotating shaft to cause the orbital motion. The scroll type fluid displacement apparatus also includes a rotation preventing device which prevents the rotation of the orbiting scroll to thereby maintain both scrolls in a predetermined angular relationship during operation of the apparatus.

Sealing along the line contacts of the above conventional scroll type apparatus must be maintained because the fluid pockets are defined by the line contacts between the two spiral elements and as the line contacts shift along the surface of the spiral elements, the fluid pockets change volume due to the orbital motion of the orbiting scroll. Since the orbiting scroll in such conventional scroll type apparatus is supported in a cantilever manner, an axial slant of the orbiting scroll occurs. Axial slant also occurs because the movement of the orbiting scroll is not rotary motion around the center of the orbiting scroll, but is orbiting motion caused by eccentric movement of a crank pin driven by the rotation of a drive shaft. Several problems result from the axial slant; such as, loss of sealing of the line contact and vibration of the apparatus during operation and noise caused by physical striking of the spiral elements.

One simple and direct solution to this problem is the use of a thrust bearing device for carrying the axial load. Thus, scroll type fluid displacement apparatus have been provided with rotation preventing and thrust bearing devices within their housing.

One recent attempt to improve rotation preventing and thrust bearing devices for scroll type fluid displacement apparatus is described in U.S. Pat. Nos. 4,160,629 (Hidden et al.) and 4,259,043 (Hidden et al.). The rotation preventing and thrust bearing devices in these U.S. patents are integral with one another. The rotation preventing/thrust bearing device described in these U.S. patents (see, e.g., FIG. 7 of Hidden et al. U.S. Pat. No. 4,259,043), comprises one set of indentations formed on the end surface of the circular plate of the orbiting scroll and a second set of indentations formed on an end surface of a fixed plate attached to the housing. A plurality of spheres are placed between facing indentations. However, the identations are formed directly on the end surface of orbiting scroll or the fixed plate. The production of this type of mechanism is therefore very intricate.

Figure 1:
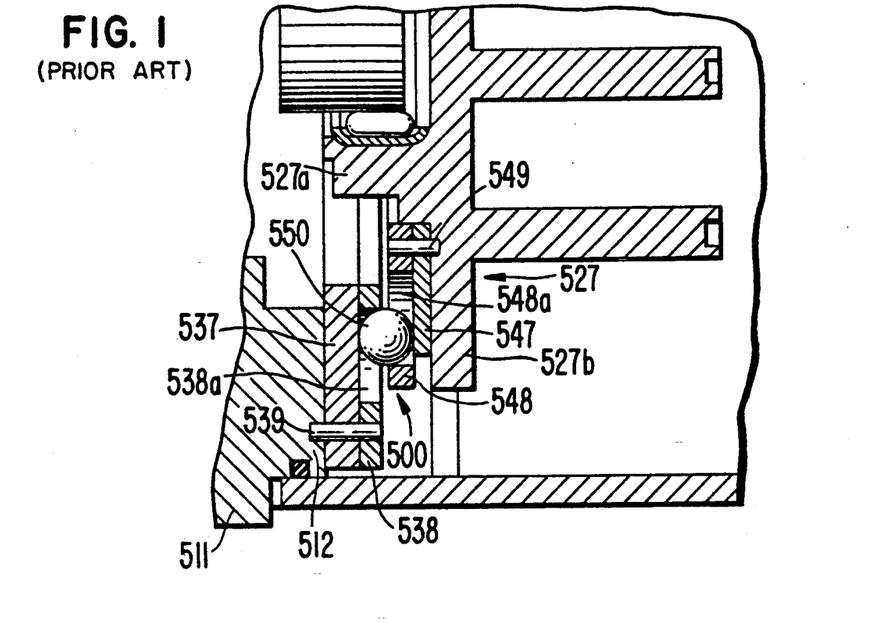
FIG. 1 is a vertical sectional view of a part of a scroll compressor unit illustrating a prior art construction of the rotation preventing/thrust bearing device.
Figures 2, 4:
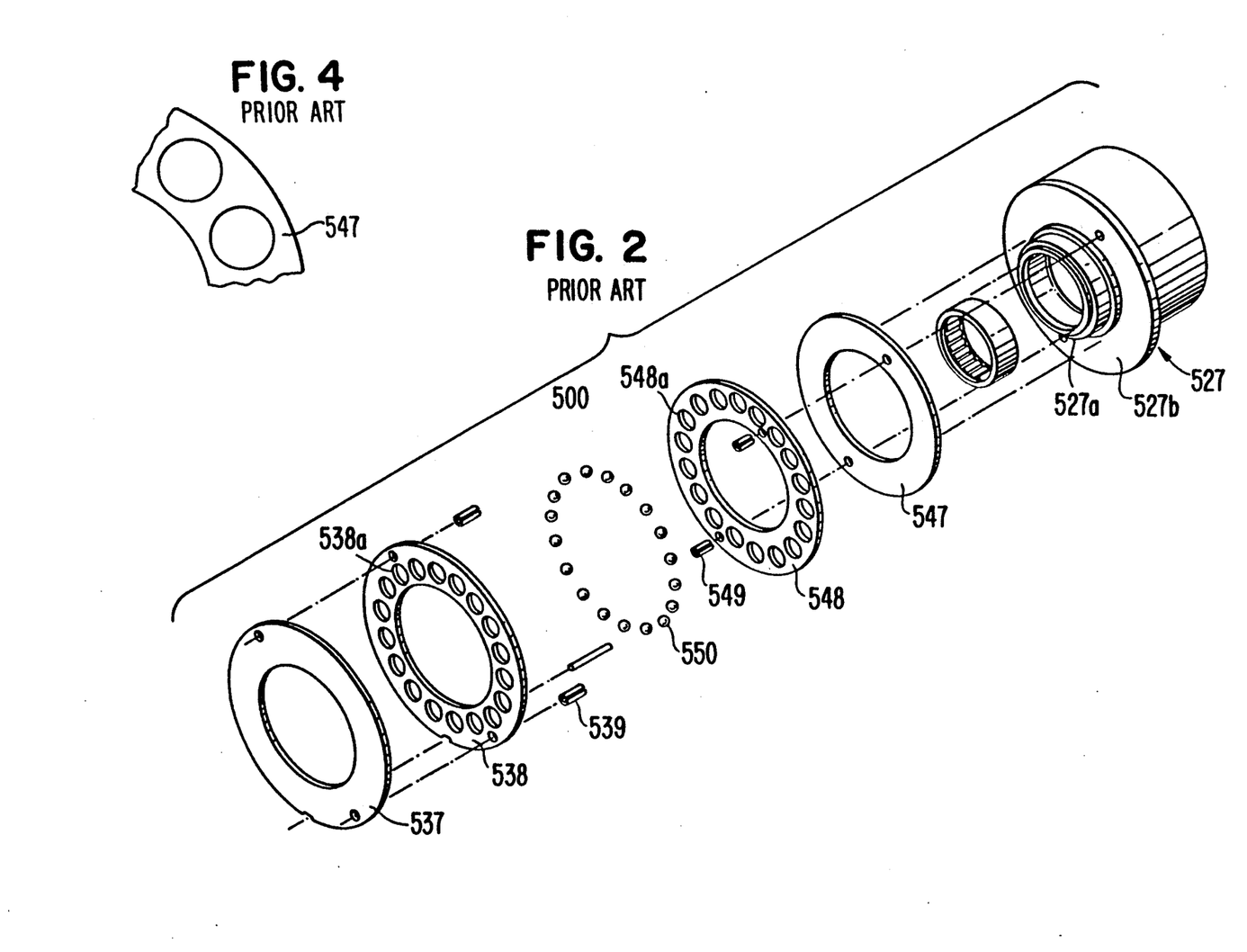
FIG. 2 is an exploded perspective view of the rotation preventing/thrust bearing device shown in FIG. 1.
FIG. 4 is a diagrammatic partial plan view of the rotation preventing/thrust bearing device shown in FIG. 1, particularly illustrating a circle on which the spheres of the rotation preventing/thrust bearing device roll during orbital motion of the orbiting scroll member.

Referring to FIGS. 1, 2 and 3, which are illustrated in U.S. Pat. No. 4,492,543 (Iimori et al.), one solution to the above disadvantage will be described. FIG. 1 is a vertical section view of a part of a compressor and FIG. 2 is an exploded perspective view of a rotation preventing/thrust bearing device 500. Rotation preventing/thrust bearing device 500 surrounds a boss 527a of orbiting scroll 527 and includes an orbital portion, a fixed portion and bearings, such as a plurality of balls. The fixed portion includes (1) a first annular race 537 having one end surface fitted against the axial end surface of annular projection 512 of front end plate 511, and (2) a first ring 538 fitted against the other axial end surface of first race 537 to extend outwardly therefrom and cover the other axial end surface of first race 537. First race 537 and first ring 538 are attached to the axial end surface of annular projection 512 by pins 539. The orbital portion also includes (1) a second annular race 547, which has one end surface fitted against an axial end surface of circular plate 527b and (2) a second ring 548 fitted against the other axial end surface of second race 547 to extend outwardly therefrom and cover the other axial end surface of second race 547. A small clearance is maintained between the end surface of first ring 538 and the end surface of second ring 548. Second race 547 and second ring 548 are attached to the end surface of circular plate 527b by pins 549.

First ring 538 and second ring 548 each have a plurality of holes or pockets 538a and 548a in the axial direction, the number of holes or pockets in each ring 538, 548 being equal. Bearing elements, such as balls or spheres 550, are placed between facing generally aligned pairs of pockets 538a, 548a of first and second rings 538, 548, with the rings 538, 548 facing one another at a predetermined clearance.

Figure 3:
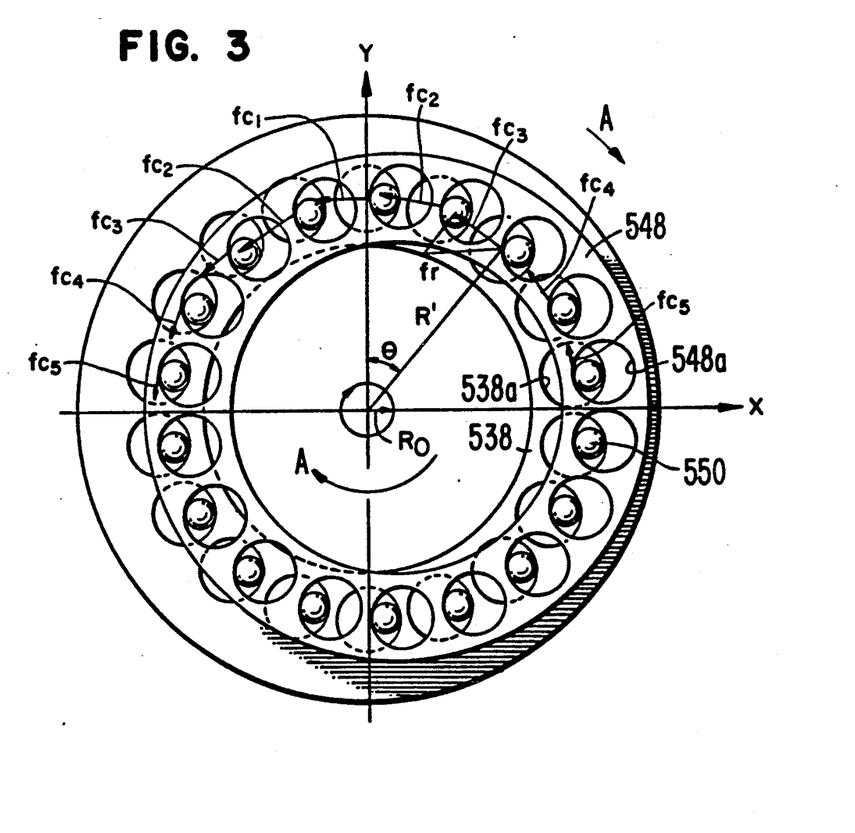
FIG. 3 is a diagrammatic plan view of the rotation preventing/thrust bearing device of FIG. 1 illustrating the manner by which rotation is prevented.

Referring to FIG. 3, the operation of the rotation preventing/thrust bearing device 500 will be described. In FIG. 3, the center of second ring 548 is placed at the right side and the rotating direction of the drive shaft is clockwise as indicated by arrow "A". When orbiting scroll 527 is driven by the rotation of the drive shaft, the center of second ring 548 orbits about a circle of radius "$R_o$" (together with orbiting scroll 527). However, a rotating force, i.e., moment, which is caused by the offset of the acting point of the reaction force of compression and the acting point of drive force, acts on orbiting scroll 527. This reaction force tends to rotate orbiting scroll 527 in a clockwise direction about center of second ring 548. But, as shown in FIG. 3, eighteen balls 550 are placed between the corresponding pockets 538a and 548a of rings 538 and 548. In the position shown in FIG. 3, the interaction between the nine balls 550 at the top of the rotation preventing/thrust bearing device and the edges of the pockets 538a and 548a prevents the rotation of orbiting scroll 527. The magnitude of the rotation preventing forces are shown as $fc_1$–$fc_5$ in FIG. 3.

In the construction, as described above, the rotation preventing/thrust bearing device 500 is made up of a pair of races and a pair of rings, with each race and ring formed separately. Therefore, the parts of the rotation/thrust bearing device are easy to construct and the most suitable material for each part can be selected, for example, steel for each part. However, as shown in FIG. 4, since first and second races 537, 547 are fixedly attached to the axial end surface of annular projection 512 and the end surface of circular end plate 527b, respectively, each of the spheres 550 traces a circle onto first and second races 537, 547 during orbital motion of orbiting scroll 527. As a result, the surfaces of first and second races 537, 547 receiving the spheres tends to easily exfoliate at the circular trace over a lapse of time. Consequentially, the exfoliation extends radially inwardly and radially outwardly from the circular trace so that the life of the compressor is reduced.

Figure 5:
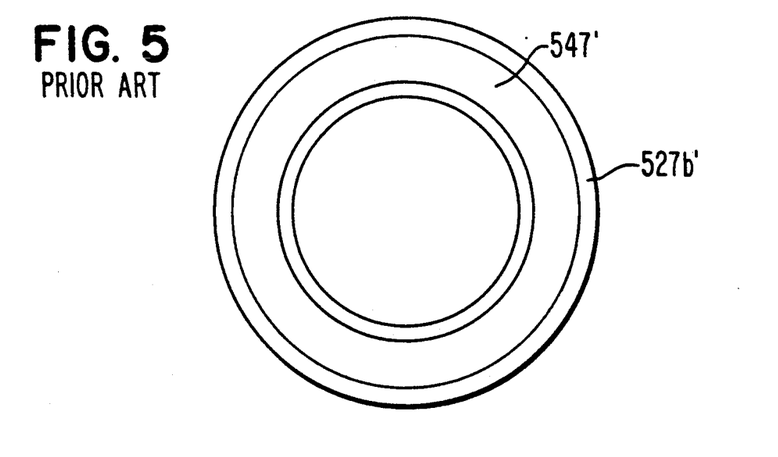
FIG. 5 is a diagrammatic plan view of a rotation preventing/thrust bearing device of a scroll compressor unit according to another prior art embodiment. In the drawing, a circular plate of an orbiting scroll member and a second race disposed on the axial end surface of the circular plate are illustrated.
Figure 6:
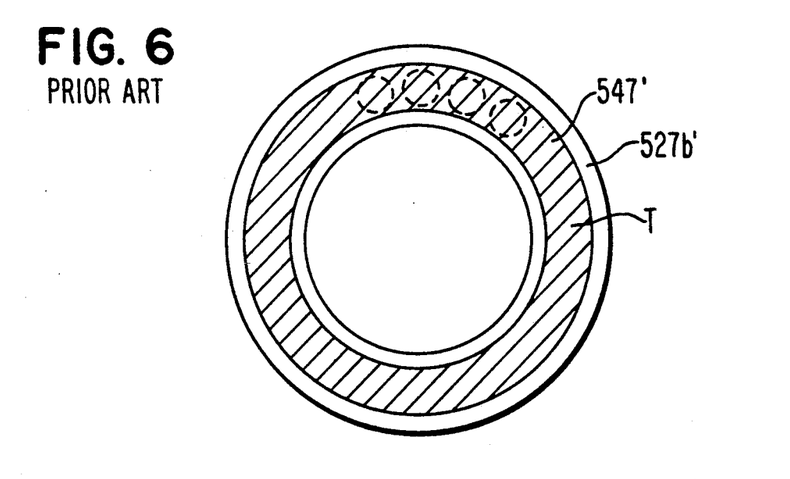
FIG. 6 is a diagrammatic plan view of the rotation preventing/thrust bearing device shown in FIG. 5, particularly illustrating an area in which the spheres of the rotation preventing/thrust bearing device roll during orbital motion of the orbiting scroll member.
Figure 7:
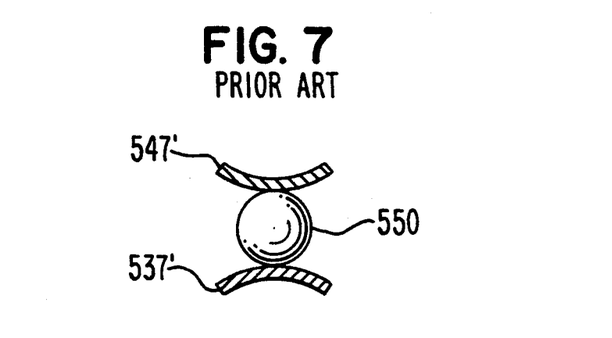
FIG. 7 is a diagrammatic vertical sectional view of the rotation preventing/thrust bearing device shown in FIG. 5 particularly illustrating a warp of the first and second races caused by the rolling action of the spheres.

On the other hand, referring to FIG. 5, when second race 547' is loosely disposed on the end surface of circular plate 527b' in a radial direction and is covered by the second ring with a slight axial clearance, second race 547' can freely rotate during orbital motion of the orbiting scroll. Therefore, as shown in FIG. 6, the spheres trace an annular area T onto second race 547'. Since the above relation between the second race 547' and the circular plate 527b' of the orbiting scroll is applicable to the first race and the front end plate, the spheres also trace an annular area onto the first race as well. Accordingly, the annular area of the first and second races are rolled by virtue of receiving a thrust force generated by gas pressure in the fluid pockets through spheres so that the first and second races 537', 547' warp in the opposite direction as shown in FIG. 7. Therefore, the races are required to be sufficiently thick to prevent the warp thereof. Thereby, weight of the races is increased so that weight of the compressor is also increased.

SUMMARY OF THE INVENTION

Accordingly, it is an object of this invention to provide a durable rotation preventing/thrust bearing device for an orbiting member fluid displacement apparatus without an increase in the weight thereof.

An orbiting member fluid displacement apparatus according to this invention includes a housing. A fixed member is attached to the housing and has a first end plate from which a first spiral element extends into the interior of the housing. An orbiting member has a second end plate from which a second spiral element extends. The first and second spiral elements interfit at a radial offset to make a line contact to separate a fluid inlet from a fluid outlet. A driving mechanism including a drive shaft, which is rotatably supported by the housing is connected to the orbiting member to effect the orbital motion of the orbiting member.

A rotation preventing/thrust bearing device is connected to the orbiting member for preventing the rotation of the orbiting member during orbital motion so that the fluid pocket changes volume during the orbital motion of the orbiting member.

The rotation preventing/thrust bearing device comprises an orbital portion, a fixed portion and a plurality of bearings such as balls or spheres. The fixed portion includes a first annular race and a first ring, both of which are formed separately. The first race is placed within a first annular groove formed on an inner surface of the housing. The first ring is attached to the inner surface of the housing to cover the first race and has a plurality of first pockets formed in an axial direction toward the first race. The orbital portion includes a second annular race and a second ring, both of which are formed separately. The second race is placed within a second annular groove formed on an end surface of the second end plate opposite to the side from which the second spiral element extends. The second ring is attached to the end surface of the second end plate to cover the second race and has a plurality of second pockets formed in an axial direction toward the second race. A clearance is maintained between the second ring of the orbital portion and the first ring of the fixed portion. The bearings are placed between facing generally aligned first and second pockets of the rings. The rotation of the orbiting member is thus prevented by the bearings which are placed in the pockets of both rings and the thrust load from the orbiting member is supported by the first race of fixed portion through the bearings. The first and second races are placed within the first and second grooves respectively in order to be able to circumferentially and radially move within a restricted range.

Further objects, features and other aspects of this invention will be understood from the following detailed description of the preferred embodiments of this invention, referring to the annexed drawings.

DETAILED DESCRIPTION OF THE PREFERRED EMBODIMENTS

Figure 8:
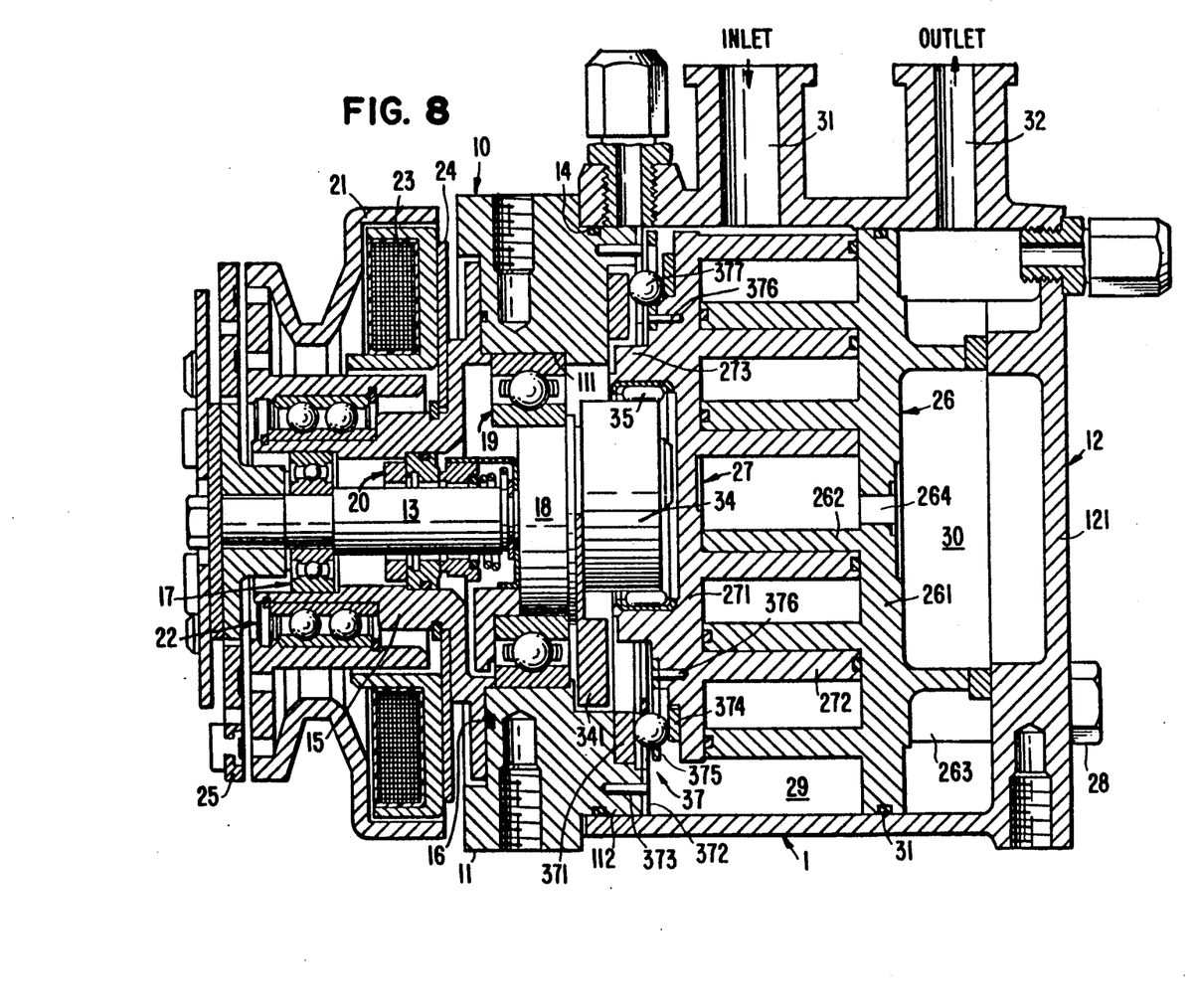
FIG. 8 is a vertical sectional view of a compressor unit according to one embodiment of the present invention.

Referring to FIG. 8, a fluid displacement apparatus in accordance with one embodiment of the present invention, in particular a scroll type refrigerant compressor unit 1, is shown. The compressor unit 1 includes a compressor housing 10 having a front end plate 11 and a cup-shaped casing 12 which is attached to an end surface of front end plate 11. An opening 111 is formed in the center of front end plate 11 for the penetration or passage of a drive shaft 13. An annular projection 112 is formed in a rear end surface of front end plate 11. Annular projection 112 faces cup-shaped casing 12 and is concentric with opening 111. An outer peripheral surface of annular projection 112 extends into an inner wall of the opening of cup-shaped casing 12. Cup-shaped casing 12 is fixed on the rear end surface of front end plate 11 by a fastening device, for example, bolts and nuts. The opening portion of cup-shaped casing 12 is thus covered by front end plate 11. An O-ring 14 is placed between the outer peripheral surface of annular projection 112 and the inner wall of the opening of cup-shaped casing 12, to seal the mating surfaces of front end plate 11 and cup-shaped casing 12. Front end plate 11 has an annular sleeve 15 projecting from the front end surface thereof which surrounds drive shaft 13 and defines a shaft cavity. In the embodiment shown in FIG. 8, sleeve 15 is separate from front end plate 11. Therefore, sleeve 15 is fixed to the front end surface of front end plate 11 by screws (not shown). An O-ring 16 is placed between the end surface of front end plate 11 and an end surface of sleeve 15 to seal fitting surface of front end plate 11 and sleeve 15. Alternatively, sleeve 15 may be integral with end plate 11.

Drive shaft 13 is rotatably supported by sleeve 15 through a bearing device 17 located within the front end of sleeve 15. Drive shaft 13 has a disk 18 at its inner end which is rotatably supported by front end plate 11 through a bearing device 19 located within opening 111 of front end plate 11. A shaft seal assembly 20 is coupled to drive shaft 13 within the shaft seal cavity of sleeve 15.

A pulley 21 is rotatably supported by a bearing assembly 22 which is carried on the outer surface of sleeve 15. An electromagnetic coil 23 is fixed about the outer surface of sleeve 15 by a support plate 24 and is received in annular cavity of pulley 21. An armature plate 25 is elastically supported on the outer end of drive shaft 13 which extends from sleeve 15. A magnetic clutch thus includes pulley 21, magnetic coil 23 and armature plate 25. In operation, drive shaft 13 is driven by an external drive power source, for example, a vehicle engine, through a rotation force transmitting device such as the above-described magnetic clutch.

A fixed scroll (fixed member) 26, an orbiting scroll (orbiting member) 27, a driving mechanism for orbiting scroll 27 and a rotation preventing/thrust bearing device for orbiting scroll 27 are located within an inner chamber of cup-shaped casing 12. The inner chamber is formed between the inner wall of cup-shaped casing 12 and front end plate 11.

Fixed scroll 26 includes a circular end plate 261, a wrap or spiral element (fixed fluid displacement member) 262 affixed to or extending from one side surface of circular end plate 261, and a plurality of internally threaded bosses 263 axially projecting from the other end surface of circular plate 261. An end surface of each boss 263 is seated on the inner surface of an end plate 121 of cup-shaped casing 12 and is fixed to end plate 121 by bolts 28. Fixed scroll 26 is thus fixed within cup-shaped casing 12. Circular end plate 261 of fixed scroll 26 divides the inner chamber of cup-shaped casing 12 into a discharge chamber 30 and a suction chamber 29 with a seal ring 31 placed between the outer peripheral surface of circular plate 261 and the inner wall of cup-shaped casing 12. A hole or discharge port 264 is formed through circular plate 261 at a position near the center to spiral element 262; discharge port 264 is connected between the fluid pocket of the spiral element 262 and discharge chamber 30.

Orbiting scroll 27 also includes an end plate 271 and a wrap or spiral element (orbiting fluid displacement member) 272 affixed to or extending from one side surface of circular end plate 271. Spiral element 272 and spiral element 262 of fixed scroll 26 interfit at angular offset of 180° and a predetermined radial offset. At least a pair of fluid pockets are thereby defined between both spiral elements 262 and 272. Orbiting scroll 27 which is connected to the driving mechanism and to the rotation preventing/thrust bearing device, is driven in an orbital motion at a circular radius "$R_o$" by rotation of drive shaft 13 to thereby compress fluid passing through the compressor unit. Generally, radius "$R_o$" of orbital motion given by the following formula:

$$R_o = \frac{\text{(pitch of spiral element)} - 2(\text{wall thickness of spiral element})}{2}$$

Figure 9:
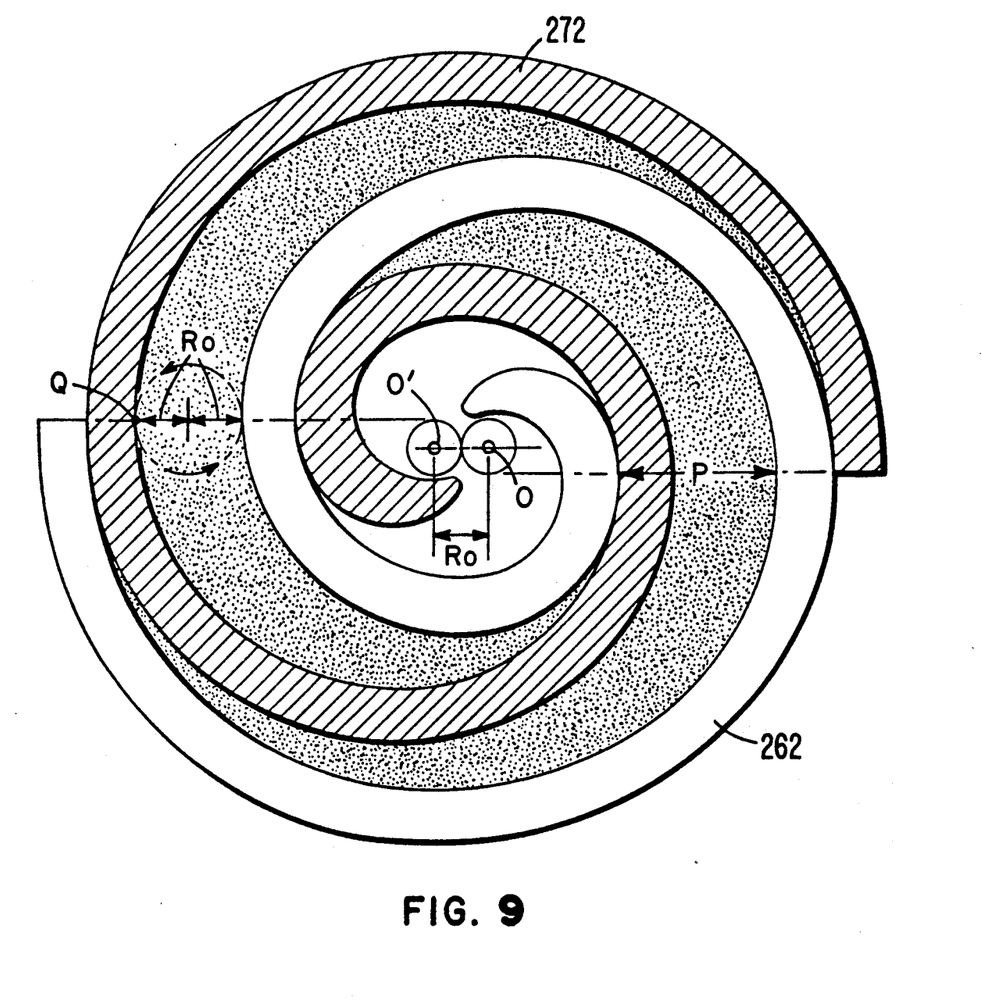
FIG. 9 is a diagrammatic sectional view illustrating the spiral elements of the fixed and orbiting scroll members.

As shown in FIG. 9, the pitch (P) of the spiral elements can be defined by "$2\pi rg$", where "rg" is the involute generating circle radius. The radius of orbital motion "$R_o$" is also illustrated in FIG. 9 as the locus of an arbitrary point "Q" on wrap 272 of orbiting scroll 27. The spiral element 272 is radially offset from spiral element 262 of fixed scroll 26 by the distance "$R_o$". Thus, orbiting scroll 27 undergoes orbital motion of a radius "$R_o$" upon rotation of drive shaft 13. As the orbiting scroll 27 orbits, the line contacts between both spiral element 262 and 272 moves toward the center of the spiral elements along the surfaces of the spiral elements. Fluid pockets, which are defined between spiral elements 262 and 272, also move to the center with a consequent reduction in volume and compression of the fluid in the fluid pockets. The fluid or refrigerant gas, which is introduced into suction chamber 29 from an external fluid circuit through an inlet port 31, is taken into fluid pockets formed between spiral elements 262 and 272 from the outer end portions of the spiral elements. As orbiting scroll 27 orbits, fluid in the fluid pockets is compressed and the compressed fluid is discharged into discharge chamber 30 from the central fluid pocket of the spiral element through hole 264. The fluid then is discharged to the external fluid circuit through an outlet port 32.

Figure 10:
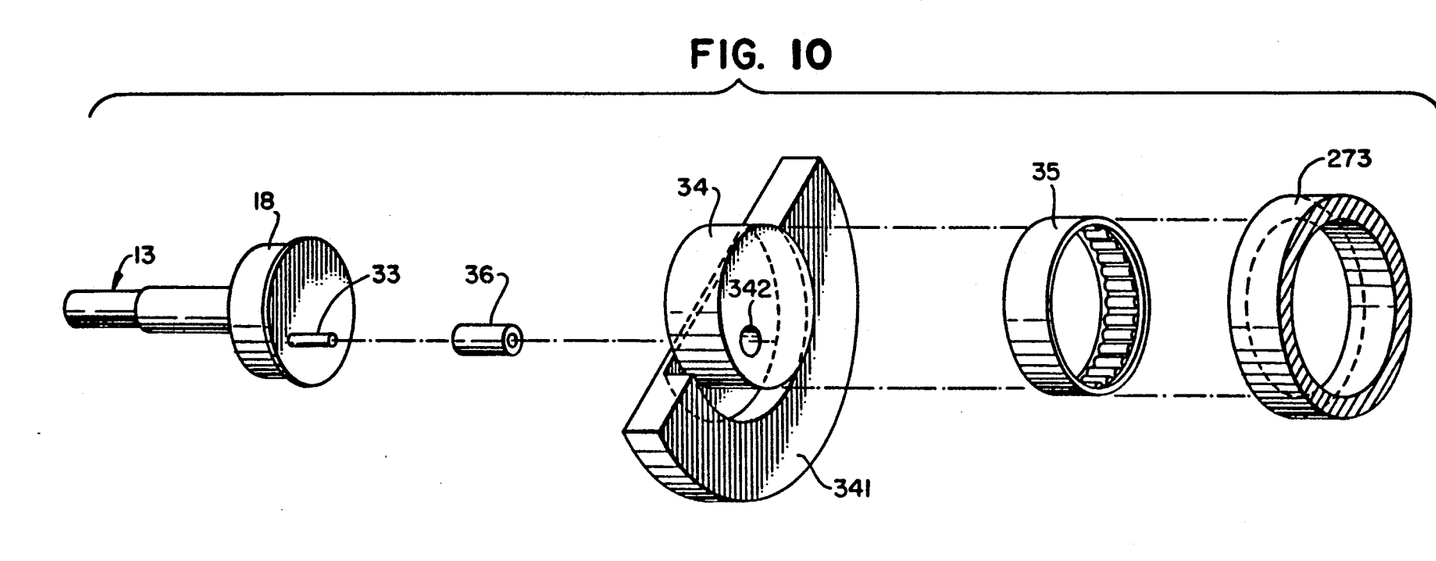
FIG. 10 is an exploded perspective view of the driving mechanism in the embodiment of FIG. 8.

Referring to FIGS. 8 and 10 again, the driving mechanism of orbiting scroll 27 will be described in greater detail. Drive shaft 13, which is rotatably supported by sleeve 15 through bearing device 17, is connected to disk 18. Disk 18 is rotatably supported by front end plate 11 through bearing device 19 located within opening 111 of front end plate 11. A crank pin or drive pin 33 projects axially from an axial end surface of disk 18 at a position which is radially offset from the center of drive shaft 13. Circular end plate 271 of orbiting scroll 27 has a tubular boss 273 axially projecting from the end surface opposite the surface from which spiral element 272 extends. A discoid or short axial bushing 34 fits into boss 273 and is rotatably supported therein by a bearing such as a needle bearing 35. Bushing 34 has a balance weight 341, which has the shape of a portion of a disk or ring and extends radially from bushing 34 along a front surface thereof. An eccentric hole 342 is formed in bushing 34 at a position radially offset from center of bushing 34. Drive pin 33 fits into the eccentrically disposed hole 342 together with a bearing 36. Bushing 34 is therefore driven in an orbital path by the revolution of drive pin 33 and rotates within needle bearing 35.

Now, the rotation of orbiting scroll 27 is prevented by a rotation preventing/thrust bearing 37 which is located between the inner surface of front end plate 11 and circular plate 271 of orbiting scroll 27. As a result, orbiting scroll 27 orbits while maintaining its angular orientation relative to the fixed scroll 26.

Figure 11:
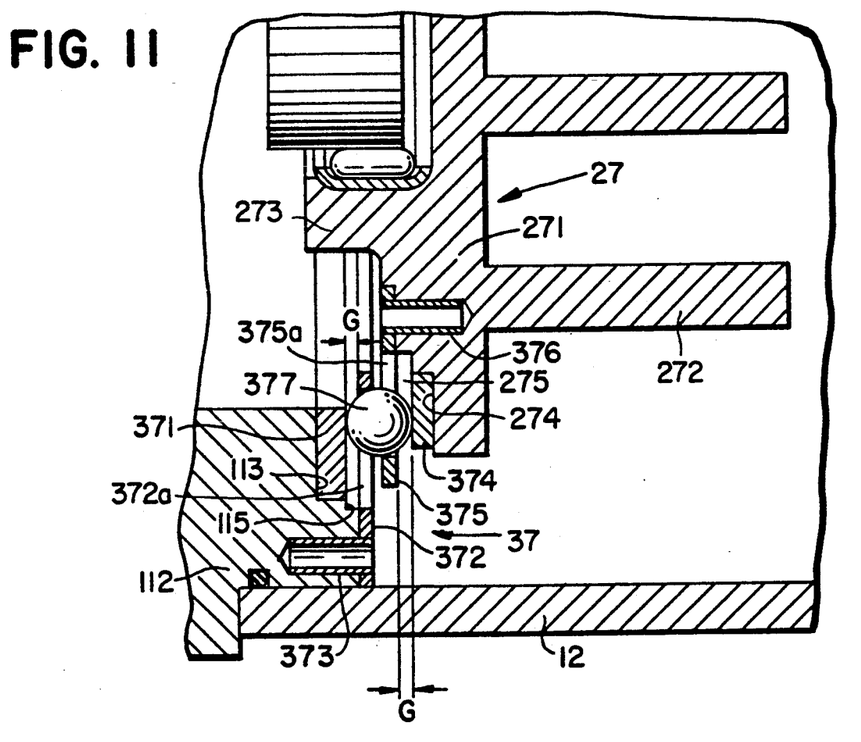
FIG. 11 is a vertical sectional view of a part of the compressor according to one embodiment of the present invention.

Referring to FIG. 11 in addition to FIG. 8, rotation preventing/thrust bearing 37 surrounds boss 273 of orbiting scroll 27. An annular groove 274 and an annular groove 275 which are surrounding boss 273 are formed in the end surface of circular plate 271. Annular groove 274 is radially outermost and deepest. A later-mentioned second race 374 is carried in annular groove 274 and has an axial end surface flush with the axial end surface of annular groove 275. The depth of annular groove 275 defines a clearance "G" between second race 374 and a later-mentioned second ring 375. Similarly, an annular groove 113 and an annular groove 115 are formed in the end surface of annular projection 112. Annular groove 113 is radially innermost and deepest. A later-mentioned first race 371 is carried in annular groove 113 and has an axial end surface flush with the axial end surface of annular groove 115. The depth of annular groove 115 defines a clearance "G" between first race 371 and a later-mentioned first ring 372 identical to the clearance between the second race 374 and the second ring 375.

Rotation preventing/thrust bearing 37 includes an orbital portion, a fixed portion and bearings, such as a plurality of balls. The fixed portion includes (1) a first annular race 371 which is placed within an annular groove 113 by a later-mentioned manner, and (2) first ring 372 fitted against the axial end surface of annular projection 112 of front end plate 11 to cover the end surface of first race 371. First ring 372 is attached to the axial end surface of annular projection 112 by pins 373. The orbital portion also includes (1) a second annular race 374, which is placed within an annular groove 274 also by the later-mentioned manner too, and (2) second ring 375 fitted against the axial end surface of circular plate 271 of orbiting scroll 27 to cover the axial end surface of second race 374. A small clearance is maintained between the end surface of first ring 372 and the end surface of second ring 375. Second ring 375 is attached to the end surface of circular plate 271 by pins 376.

First ring 372 and second ring 375 each have a plurality of holes or pockets 372a and 375a in the axial direction, the number of holes or pockets in each ring 372, 375 being equal. The holes or pockets 372a of first ring 372 correspond to or are a mirror image of the holes or pockets 375a of the second ring 375, i.e., each pair of pockets facing each other have the same size and pitch, and the radial distance of the pockets from the center of their respective rings 372 and 375 is the same, i.e., the centers of the pockets are located the same distance from the center of the rings 372 and 375. Thus, if the centers of the rings 372 and 375 were aligned, which they are not in actual operation of the rotation preventing/thrust bearing device 37, the holes or pockets 372a and 375a would be identical or in alignment. Bearing elements, such as balls or spheres 377, are placed between the edge of pocket 372a of first ring 372 and the edge of a facing, generally aligned pocket 375a of second ring 375. Therefore, the rotation of orbiting scroll 27 is prevented by balls 377, which interact with the edges of pockets 372a and 375a to prevent rotation. Also, these balls 377 carry the axial thrust load from orbiting scroll 27.

Figure 12:
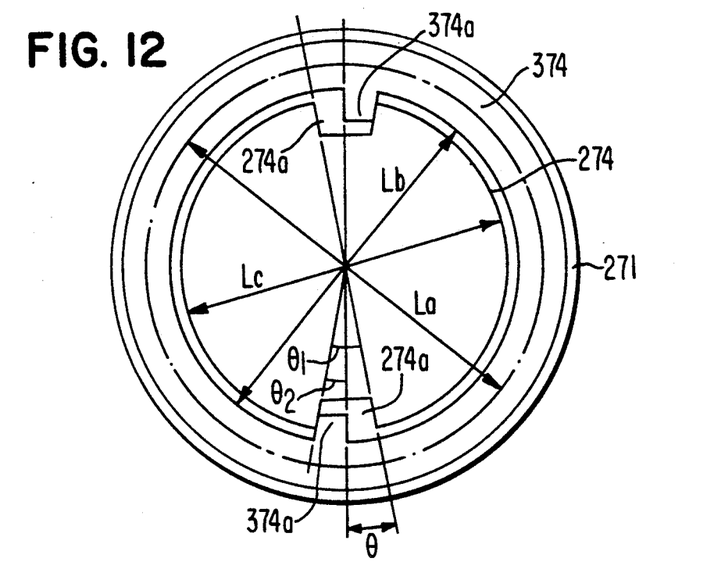
FIG. 12 is a diagrammatic plan view of a rotation preventing/thrust bearing device of the scroll compressor unit shown in FIG. 8. In the drawing, a circular plate of the orbiting scroll member and a second race disposed on the axial end surface of the circular plate are illustrated.

FIG. 12 illustrates the relation between second annular race 374 and annular groove 274 in accordance with the present invention. Annular groove 274, of which diameter "Lc" is sufficiently smaller than an inner diameter "Lb" of second race 374, is formed in the axial end surface of circular plate 271 of orbiting scroll 27. Therefore, second race 374 is loosely disposed within annular groove 274 in a radial direction. At least one truncated fan-shaped cut-out portion 274a is radially inwardly cut out from a side wall of annular groove 274. In the preferred embodiment of the present invention, a pair of cut-out portions 274a are diametrically opposed each other. At least one truncated fan-shaped projection 374a is radially inwardly projected from an inner peripheral surface of second race 374. In the preferred embodiment, a pair of projections 374a are diametrically opposed each other in order to fit within a pair of cut-out portions 274a. The length of projections 374a is equal to or smaller than the depth of cut-out portions 274a and the width of projections 374a is sufficiently smaller than the width of cut-out portions 274a. Thus, second race 374 can move in both a circumferential direction and radial direction within a restricted area during orbital motion of the orbiting scroll. The amount of circumferential and radial movements of second race 374 is defined below.

Generally, the amount of circumferential movement "Mc" of second race 374 is given by the following formula:

$$Mc = La\, (\theta) \tag{1}$$

In formula (1), "La" is the mean value between the diameters of the outer and inner peripheries of second race 374. "$\theta$" is an angular differential (radial unit) between an interior angle ($\theta_1$) of cut-out portion 274a and an interior angle ($\theta_2$) of projection 374a.

Generally, the amount of radial movement "Mr" of second race 374 is given by the following formula:

$$Mr = Lb - Lc \tag{2}$$

In formula (2), "Lb" is the diameter of the inner periphery of second race 374 and "Lc" is the diameter of annular groove 274 as previously described.

Figure 13:
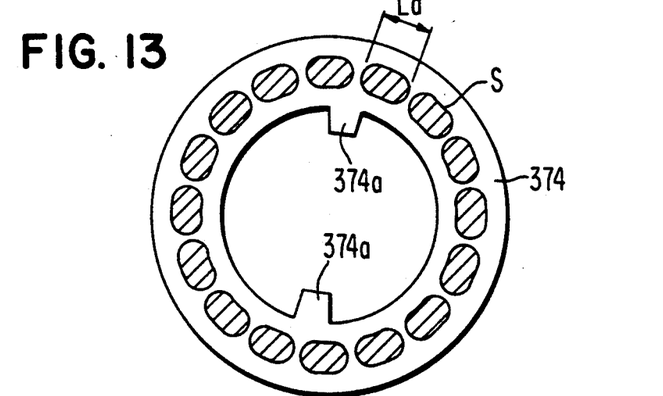
FIG. 13 is a diagrammatic plan view of the rotation preventing/thrust bearing device shown in FIG. 8, particularly illustrating an area in which the spheres of the rotation preventing/thrust bearing device roll during orbital motion of the orbiting scroll member.
Figure 17:
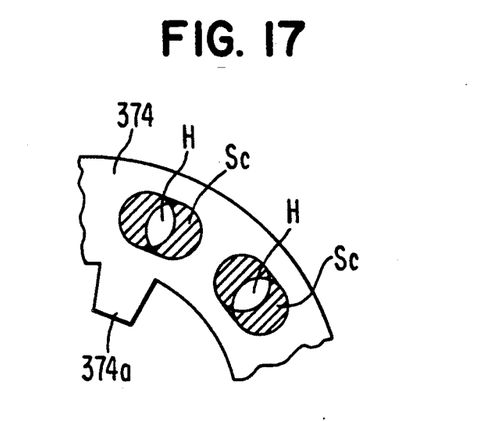
FIG. 17 is a diagrammatic plan view of the rotation preventing/thrust bearing device shown in FIG. 8, particularly illustrating an area in which the spheres of the rotation preventing/thrust bearing device roll during orbital motion of the orbiting scroll member, according to another embodiment of the present invention.

The amount of circumferential movement "Mc" of second race 374 is designed so as to be smaller than the pitch of pockets 375a but to be greater than or equal to the radius of spheres 377. Therefore, as shown in FIG. 13, each of the spheres 377 traces a corresponding arcuate ellipse area "S" onto second race 374 during the orbital motion of orbital sphere 27. The arcuate ellipse areas "S" have a major axis "Ld" which is smaller than the pitch of pockets 375a. Accordingly, since each of the spheres traces equidistant arcuate ellipse areas "S" onto second race 374, the exfoliation at the surface of second annular race 374 at the surface receiving the spheres is effectively prevented without causing any warp of the race. Thus, a durable rotation preventing/thrust bearing device for the orbiting member fluid displacement apparatus is obtained without an increase in the weight thereof. In the preferred embodiment of the present invention, the amount of circumferential movement "Mc" of second race 374 is designed so as to be smaller than the pitch of pockets 375a but to be greater than or equal to the radius of spheres 377 as described above. However, in the present invention, the amount of circumferential movement "Mc" of second race 374 can be designed so as to be smaller than the radius of spheres 377 but to be greater than or equal to a later-mentioned minimum amount of circumferential movement "Mc-min" of second race 374. In this design, each of spheres 377 traces a corresponding arcuate ellipse area "Sc", which has no trace portion "H" in its central region, onto second race 374, as shown in FIG. 17, during orbital motion of the orbiting scroll. Since area "Sc" is sufficiently large, spheres 377 roll with a manner substantially similar to the manner described in FIG. 13. Therefore, a durable rotation preventing/thrust bearing device for the orbiting fluid displacement apparatus is also obtained without an increase in the weight thereof.

Figure 14:
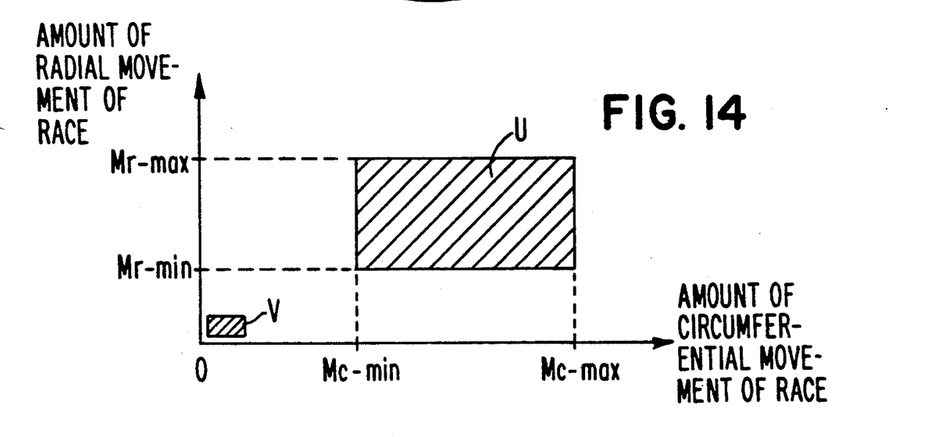
FIG. 14 is a graph in which a region defining the amount of circumferential and radial movements of the second race shown in FIG. 8 is depicted.
Figure 15:
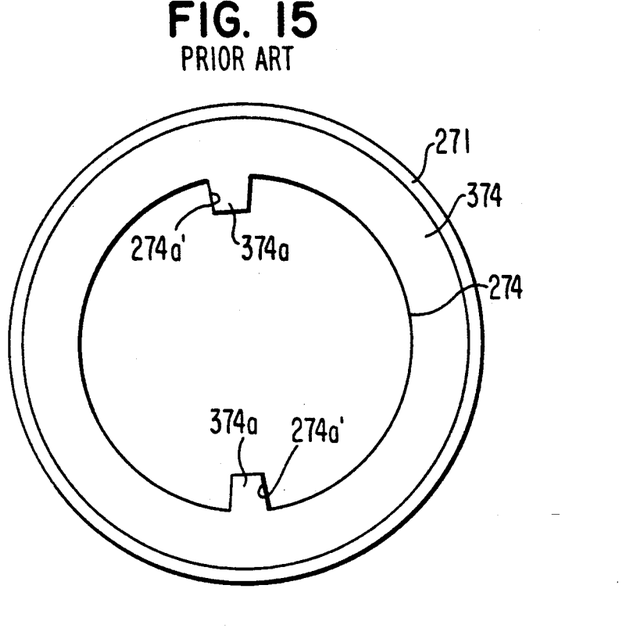
FIG. 15 is a diagrammatic plan view of a rotation preventing/thrust bearing device of a scroll compressor unit according to still another prior art embodiment. In the drawing, a circular plat of an orbiting scroll member and a second race disposed on the axial end surface of the circular plate are illustrated.

Referring to FIGS. 14 and 15, in the present invention, the minimum amount of circumferential movement "Mc-min" of second race 374 is designed to be greater than the maximum allowable amount of play which is created between truncated fan-shaped cut-out portion 274a' of circular plate 271 and truncated fan-shaped projection 374a of second race 374 when second race 374 is fixed in groove 274 by fitting as shown in FIG. 15. The minimum amount of radial movement "Mr-min" of second race 374 is designed to be greater than the maximum allowable amount of play which is created between the side wall of groove 274 and the inner peripheral surface of second race 374 when second race 374 is fixed in groove 274 by fitting as shown in FIG. 15.

Furthermore, the maximum amount of circumferential movement "Mc-max" of second race 374 is designed to be an unlimitedly asymptotical value to the pitch of pockets 375a, as approached from the smaller values of circumferential movement; that is, from the left hand side as illustrated in FIG. 14. The maximum amount of radial movement "Mr-max" of second race 374 is designed to be an unlimitedly asymptotical value to the minimum amount of play which causes second race 374 to lose contact with balls 377, as approached from the smaller values of radial movement; that is, from the bottom as illustrated in FIG. 14. Therefore, the amount of circumferential and radial movements "Mc" and "Mr" of second race 374 in the present invention are defined by region "U" as shown in FIG. 14.

Figure 16:
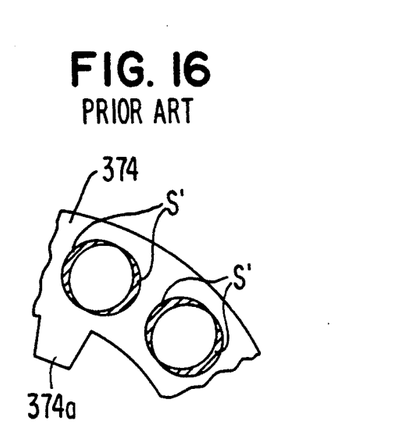
FIG. 16 is a diagrammatic partial plan view of the rotation preventing/thrust bearing device shown in FIG. 15, particularly illustrating an area in which the spheres of the rotation preventing/thrust bearing device roll during orbital motion of the orbiting scroll member.

Region "V" in FIG. 14 defines allowable amounts of play between cut-out portion 274a' and projection 374a and between the side wall of groove 274 and the inner peripheral surface of second race 374. As shown in FIGS. 15 and 16, when second race 374 is fixed in groove 274 by fitting with these allowable circumferential and radial amounts of play, each of spheres 377 traces a corresponding pair of crescent areas "S'" onto second race 374, during orbital motion of the orbiting scroll. However, since the pair of crescent areas "S'" are very small, spheres 377 roll with a manner substantially similar to the manner described in FIG. 4. Therefore, exfoliation at second race 374 cannot be sufficiently prevented.

Only the relation between second annular race 374 and second annular groove 274 formed in the axial end surface of circular plate 271 of orbiting scroll 27 is described above. However, in the present invention, the substantially same relation is embodied between first annular race 371 and first annular groove 113 formed in the axial end surface of annular projection 112 of front end plate 11. That is, a pair of truncated fan-shaped cut-out portions are radially outwardly cut out from a side wall of first annular groove 113 and a pair of truncated fan-shaped projections are radially outwardly projected from an outer peripheral surface of first race 371. The amount of circumferential and radial movements of first race 371 are designed to be similar to the amount of circumferential and radial movements of second race 374.

This invention has been described in detail in connection with preferred embodiments. These embodiments, however, are merely for example only and the invention is not restricted thereto. It will be understood by those skilled in the art that other variations and modifications can be easily made within the scope of this invention as defined by the appended claims.

We claim:

1. In a scroll type fluid displacement apparatus including a housing, a fixed scroll attached to said housing and having a first end plate from which a first wrap extends into said housing, an orbiting scroll having a second end plate from which a second wrap extends, said first and second wraps interfitting at an angular and radial offset to make a plurality of line contacts to define at least one pair of sealed off fluid pockets and a driving mechanism including a rotatable drive shaft connected to said orbiting scroll for preventing the rotation of said orbiting scroll and for carrying axial thrust load from said orbital scroll during orbital motion so that the volume of said fluid pockets changes, said rotation preventing/thrust bearing means being comprised of a discrete orbital portion, a discrete fixed portion and bearing elements coupled between said portions, a center line extending through the center of said bearing elements, said orbital portion including a second annular race and a second ring, said second annular race being placed within a second annular groove in said second end plate having an axial end surface spaced from the center line, said second ring being attached to said second end plate to cover said second race, said second ring being in contact with a contact surface of said second end plate spaced from the center line, the spacing between the center line and said contact surface being less than the spacing between the center line and said axial end surface, said second ring having a plurality of second pockets extending axially toward said second race and formed separately from said second race, said fixed portion including a first annular race and a first ring, said first annular race being placed within a first annular groove formed in said housing, said first annular groove in said housing having an axial end surface spaced from the center line, said first ring being attached to said housing to cover said first race and facing said second ring, said first ring being in contact with a contact surface of said housing spaced from the center line, the spacing between the center line and said last-mentioned contact surface being less than the spacing between the center line and said last-mentioned axial end surface, said first ring having a plurality of first pockets extending axially toward said first race and formed separately from said first race, said bearing elements each being carried within a generally aligned pair of said first and second pockets and contacting said second and first races to prevent the rotation of said orbiting scroll by said bearing elements interacting with said second and first rings and to carry the axial thrust load from said orbiting scroll on said first race through said bearing elements, the improvement comprising:

mounting means for said first and second races allowing a significant predetermined and calculated amount of radial and circumferential movement of said first and second races relative to said first and second annular grooves, respectively, such that during orbital motion said bearing elements travel in a path substantially different from a circular path so as to minimize exfoliation and warping of said first and second races.

2. A scroll type fluid displacement apparatus as claimed in claim 1, wherein said mounting means includes a diameter of an outer periphery of said first race being smaller than a diameter of an outer side wall of said first annular groove in order to allow for circumferential and radial movement of said first race, a diameter of an inner periphery of said second race being greater than a diameter of an inner side wall of said second annular groove in order to allow for circumferential and radial movement of said second race, the amount of said radial movement of said first race being restricted by a differential between the diameter of said outer periphery of said first race and the diameter of said outer side wall of said first annular groove, the amount of said radial movement of said second race being restricted by a differential between the diameter of said inner periphery of said second race and the diameter of said inner side wall of said second annular groove, said first annular groove including at least one first cut-out portion radially outwardly cut out from said outer side wall of first annular groove, said first annular race including at least one first projection radially outwardly projecting from an outer peripheral surface of said first race, said first projection engaging with said first cut-out portion and forming a gap therebetween to restrict the circumferential movement of said first race to a predetermined range, said second annular groove including at least one second cut-out portion radially inwardly cut out from said inner side wall of said second annular groove, said second annular race including at least one second projection radially inwardly projecting from an inner peripheral surface of said second race, said second projection engaging with said second cut-out portion and forming a gap therebetween to restrict the circumferential movement of said second race to a predetermined range.

3. A scroll type displacement apparatus as claimed in claim 2, wherein said first and second cut-out portions and said first and second projections are truncated fan-shaped.

4. A scroll type displacement apparatus as claimed in claim 2, wherein the length of respective first and second projections is equal to or smaller than the depth of respective first and second cut-out portions and the width of respective first and second projections is sufficiently smaller than the width of respective first and second cut-out portions.

5. A scroll type displacement apparatus as claimed in claim 4, wherein the maximum amount of circumferential movement of said first race is an unlimitedly asymptotical value to the pitch of said first pockets, as approached from the smaller values of circumferential movement.

6. A scroll type displacement apparatus as claimed in claim 4, wherein the maximum amount of circumferential movement of said second race is an unlimitedly asymptotical value to the pitch of said second pockets, as approached from the smaller values of circumferential movement.

7. A scroll type displacement apparatus as claimed in claim 4, wherein the minimum amount of circumferential movement of said first race is greater than the maximum amount of play which is created between said first projection and said first cut-out portion when said first race is fixed in said first groove by fitting.

8. A scroll type displacement apparatus is claimed in claim 4, wherein the minimum amount of circumferential movement of said second race is greater than the maximum amount of play which is created between said second projection and said second cut-out portion when said second race is fixed in said second groove by fitting.

9. A scroll type displacement apparatus as claimed in claim 4, wherein the maximum amount of radial movement of said first race is an unlimitedly asymptotical value to the minimum amount of play which causes said first race to lose contact with said bearing elements, as approached from the smaller values of radial movement.

10. A scroll type displacement apparatus as claimed in claim 4, wherein the maximum amount of radial movement of said second race is an unlimitedly asymptotical value to the minimum amount of play which causes said second race to lose contact with said bearing elements, as approached from the smaller values of radial movement.

11. A scroll type displacement apparatus as claimed in claim 4, wherein the minimum amount of radial movement of said first race is greater than the maximum amount of play which is created between the outer side wall of said first groove and the outer peripheral surface of said first race when said first race is fixed in said first groove by fitting.

12. A scroll type displacement apparatus as claimed in claim 4, wherein the minimum amount of radial movement of said second race is greater than the maximum amount of play which is created between the inner side wall of said second groove and the inner peripheral surface of said second race when said second race is fixed in said second groove by fitting.

13. A scroll type fluid displacement apparatus comprising:
- a housing having a front end plate;
- a fixed scroll attached to said housing and having a first end plate from which a first wrap extends into an interior of said housing;
- an orbiting scroll having a second end plate from which a second wrap extends, said first and second wraps interfitting at an angular and radical offset to make a plurality of line contacts to define at least a pair of sealed off fluid pockets;
- a driving mechanism including a rotatable drive shaft connected to said orbiting scroll to drive said orbiting scroll in orbital motion;
- rotation preventing/thrust bearing means connected to said orbiting scroll for preventing the rotation of said orbiting scroll and for carrying the axial thrust of said orbiting scroll during its orbital motion;
- said rotation preventing/thrust bearing means comprising a discrete orbital portion, a discrete fixed portion and bearing elemnts, a center line extending through the center of said bearing elements, said orbital portion including a second annular race and a second annular ring both of which are formed separately, said second annular race having a circumferential and radial movement, said second annular race being placed within an annular groove formed in an end surface of said second end plate on an opposite side from which said second wrap extends, said annular groove in said second end plate having an axial end surface spaced from the center line, said second ring being attached to the end surface of said second end plate to cover said second race, said second ring being in contact with a contact surface of said second end plate spaced from the center line, the spacing between the center line and said contact surface being less than the spacing between the center line and said axial end surface, a plurality of pockets being formed in said second ring in an axial direction toward said second race, said fixed portion including a first annular race and a first ring both of which are formed separately, said first annular race having a circumferential and radial movement, said first annular race being placed within an annular groove formed in an inner surface of said housing, said annular groove in said housing having an axial end surface spaced from the center line, said first ring being attached to the inner surface of said housing to cover said first race, said first ring being in contact with a contact surface of said housing spaced from the center line, the spacing between the center line and said last-mentioned contact surface being less than the spacing between the center line and said last-mentioned axial end surface, a plurality of pockets being formed in said first ring in an axial direction toward said first race, said pockets of said second and first rings facing one another in generally aligned pairs and having corresponding size, pitch and radial distance, said bearing elements each being carried within one of said generally aligned pairs of pockets and contacting said second and first races to prevent the rotation of said orbiting scroll by said bearing elements interacting with said second and first rings and to carry the axial thrust load from said orbiting scroll on said first race through said bearing elements
- mounting means for allowing significant circumferential and radial movement of said second race; and
- mounting means for allowing significant circumferential and radial movement of said first race;
- wherein said mounting means allows a predetermined and calculated amount of circumferential and radial movement of said first and second races relative to said first and second annular grooves, respectively, such that during orbital motion said bearing elements travel in a path substantially different from a circular path so as to minimize exfoliation and warping of said first and second races.

14. A scroll type fluid displacement apparatus as claimed in claim 13, wherein said mounting means allowing the circumferential and radial movements of said first and second races to a predetermined amount includes a diameter of an outer periphery of said first race being smaller than a diameter of an outer side wall of said first annular groove in order to allow for circumferential and radial movement of said first race, a diameter of an inner periphery of said second race being greater than a diameter of an inner side wall of said second annular groove in order to allow for circumferential and radial movement of said second race, the amount of said radial movement of said first race being restricted by a differential between the diameter of said outer periphery of said first race and the diameter of said outer side wall of said first annular groove, the amount of said radial movement of said second race being restricted by a differential between the diameter of said inner periphery of said second race and the diameter of said inner side wall of said second annular groove, said first annular groove including at least one first cut-out portion radially outwardly cut out from said outer side wall of first annular groove, said first annular race including at least one first projection radially outwardly projecting from an outer peripheral surface of said first race, said first projection engaging with said first cut-out portion and forming a gap therebetween to restrict the circumferential movement of said first race to a predetermined range, said second annular groove, including at least one second cut-out portion radially inwardly cut out from said inner side wall of said second annular groove, said second annular race including at least one second projection radially inwardly projecting from an inner peripheral surface of said second race, said second projection engaging with said second cut-out portion and forming a gap therebetween to restrict the circumferential movement of said second race to a predetermined range.

15. A scroll type displacement apparatus as claimed in claim 14, wherein said first and second cut-out portions and said first and second projections are truncated fan-shaped.

16. A scroll type displacement apparatus as claimed in claim 14, wherein the length of respective first and second projections is equal to or smaller than the depth of respective first and second cut-out portions, and the width of respective first and second projections is sufficiently smaller than the width of respective first and second cut-out portions.

17. A scroll type displacement apparatus as claimed in claim 16, wherein the maximum amount of circumferential movement of said first race is an unlimitedly asymptotical value to the pitch of said first pockets, as approached from the smaller values of circumferentia movement.

18. A scroll type displacement apparatus as claimed in claim 16, wherein the maximum amount of circumferential movement of said second race is an unlimitedly asymptotical value to the pitch of said second pockets, a approached from the smaller values of circumferential movement.

19. A scroll type displacement apparatus as claimed in claim 16, wherein the minimum amount of circumferential movement of said first race is greater than the maximum amount of play which is created between said first projection and said first cut-out portion when said first race is fixed in said first groove by fitting.

20. A scroll type displacement apparatus is claimed in claim 16, wherein the minimum amount of circumferential movement of said second race is greater than the maximum amount of play which is created between said second projection and said second cut-out portion when said second race is fixed in said second groove by fitting.

21. A scroll type displacement apparatus as claimed in claim 16, wherein the maximum amount of radial movement of said first race is an unlimitedly asymptotical value to the minimum amount of play which causes said first race to lose contact with said bearing elements, as approached from the smaller values of radial movement.

22. A scroll type displacement apparatus as claimed in claim 16, wherein the maximum amount of radial movememt of said second race is an unlimitedly asymptotical value to the minimum amount of play which causes said second race to lose contact with said bearing elements, as approached from the smaller values of radial movement.

23. A scroll type displacement apprartus as claimed in claim 16, wherein the minimum amount of radial movement of said first race is greater than the maximum amount of play which is created between the outer side wall of said first groove and the outer peripheral surface of said first race when said first race is fixed in said first groove by fitting.

24. A scroll type displacement apparatus as claimed in claim 16, wherein the minimum amount of radial movement of said second race is greater than the maximum amount of play which is created between the inner side wall of said second groove and the inner peripheral surface of said second race when said second race is fixed in said second groove by fitting.

25. In an orbiting member fluid displacement apparatus including a housing, a fixed member attached to or integral with said housing and having a first end plate from which a first sprial element extends into the interior of said housing, an orbiting member having a second end plate from which a second spiral element extends, said first and second spiral elements interfitting at a radial offset to make a line contact to separate a fluid outlet from a fluid inlet and a driving mechanism including a rotatable drive shaft connected to said orbiting member to drive said orbiting member in an orbital motion, rotation preventing/thrust bearing means connected to said orbiting member for preventing the rotation of said orbiting member and for carrying axial thrust load from said orbital member during orbital motion so that the line contact moves toward a discharge opening, said rotation preventing/thrust bearing means being comprised of a discrete fixed portion, a discrete orbital portion and bearing elements coupled between said portions, a center line extending through the center of said bearing elements, said fixed portion including a first annular race and a first ring, said first annular race being placed within a first annular groove formed in said housing, said first annular groove in said housing having an axial end surface spaced from the center line, said first ring being attached to said housing to cover said first race, said first ring being in contact with a contact surface of said housing spaced from the center line, the spacing between the center line and said contact surface being less than the spacing between the center line and said axial end surface, said first ring having a plurality of first pockets extending axially toward said first race, said orbital portion including a second annular race and a second ring, said second annular race being placed within a second annular groove formed in said second end plate on an opposite side from which said second spiral element extends, said second annular groove in said second end plate having an axial end surface spaced from the center line, said second ring attached to said second end plate to cover said second race and facing said first ring, said second ring being in contact with a contact surface of said second end plate spaced from the center line, the spacing between the center line and said last-mentioned contact surface being less than the spacing between the center line and said last-mentioned axial end surface, said second ring having a plurality of second pockets extending axially toward said second race, said bearing elements each beig carried within a generally aligned pair of said first and second pockets and contacting said first and second races to prevent the rotation of said orbiting member by said bearing elements interacting with said first and second rings and to carry the axial thrust load from said orbiting member on said first race through said bearing elements, the improvement comprising:

a diameter of an outer periphery of said first race being smaller than a diameter of an outer side wall of said first annular groove in order to allow for circumferential and radial movement of said first race, a diameter of an inner periphery of second race being greater than a diameter of an inner side wall of said second annular groove in order to allow for circumfential and radial movement of said second race, the amount of said radial movement of said first race being restricted by a differential between the diameter of said outer periphery of said first race and the diameter of said outer side wall of said first annular groove, the amount of said radial movement of said second race being restricted by a differential between the diameter of said inner periphery of said second race and the diameter of said inner side wall of said second annular groove, said first annular groove including at least one first cut-out portion radially outwardly cut out from said outer side wall of first annular groove, said first annular race including at least one first projection radially outwardly projecting from an outer peripheral surface of said first race, said first projection engaging with said first cut-out portion and forming a gap therebetween to restrict the circumferential movement of said first race to a predetermined range, said second annular groove including at least one second cut-out portion radially inwardly cut out from said inner side wall of said second annular groove, said second annular race including at least one second projection radially inwardly projecting from an inner peripheral surface of said second race, said second projection engaging with said second cut-out portion and forming a gap therebetween to restrict the circumferential movement of said second race to a predetermined range.

26. An orbiting member fluid displacement apparatus as claimed in claim 25, wherein said plurality of first pockets are indentically shaped circles disposed around the circumference of said first ring with a predetermined pitch.

27. An orbiting member fluid apparatus as claimed in claim 26, wherein said plurality of second pockets are identical to said first pockets and are disposed around the circumference of said second ring with a predetermined pitch.

* * * * *